US005594819A

United States Patent [19]
Narendran et al.

[11] Patent Number: 5,594,819
[45] Date of Patent: Jan. 14, 1997

[54] FIELD-MOUNTABLE FIBER OPTIC SENSORS FOR LONG TERM STRAIN MONITORING IN HOSTILE ENVIRONMENTS

[75] Inventors: Nadarajah Narendran, Clifton Park, N.Y.; Joseph M. Weiss, Cupertino, Calif.

[73] Assignee: Electric Power Research Institute, Palo Alto, Calif.

[21] Appl. No.: 507,786

[22] Filed: Jul. 26, 1995

[51] Int. Cl.$^6$ ............................................. G01L 1/24
[52] U.S. Cl. ...................... 385/12; 73/800; 250/227.14
[58] Field of Search ...................... 385/12, 13; 73/800; 250/227.14, 227.16, 227.19

[56] References Cited

U.S. PATENT DOCUMENTS

| 3,846,795 | 11/1974 | Jones | 540/340 |
|---|---|---|---|
| 4,078,432 | 3/1978 | Stewart | 250/227.14 X |
| 4,421,979 | 12/1983 | Asawa et al. | 250/227.16 |
| 4,459,477 | 7/1984 | Asawa et al. | 250/227.16 |
| 4,463,254 | 7/1984 | Asawa et al. | 250/227.16 |
| 4,477,725 | 10/1984 | Asawa et al. | 250/227.16 |
| 4,915,473 | 4/1990 | Haese et al. | 13/385 |
| 5,020,379 | 6/1991 | Berthold et al. | 73/800 |
| 5,026,139 | 6/1991 | Klainer et al. | 128/356 |
| 5,212,755 | 5/1993 | Holmberg | 107/385 |
| 5,289,552 | 2/1994 | Miller et al. | 73/385 |
| 5,315,110 | 5/1994 | Smith | 227.27/250 |
| 5,321,778 | 6/1994 | Com-Nougue et al. | 13/385 |
| 5,345,519 | 9/1994 | Lu | 12/385 |
| 5,359,688 | 10/1994 | Underwood | 70/385 |
| 5,361,284 | 11/1994 | Baum et al. | 245/376 |

OTHER PUBLICATIONS

R. Griffiths, et al., Monitoring and control of electric power generation using fiber optics for physical parameter sensing, Jun. 6–8, 1995, SPIE Conf. paper, 4 pp.

*Primary Examiner*—John D. Lee
*Attorney, Agent, or Firm*—Flehr, Hohbach, Test, Albritton & Herbert; Michael A. Kaufman, Esq.

[57] ABSTRACT

A metallized glass fiber optic is braze-bonded or solder-bonded to a metal shim to form a sensor unit that may be spot welded to a structure for monitoring structural strain. Preferably shim thermal characteristics are selected to match those of the structure being monitored, and a cover plate protects the fiber after attachment to the shim. Alternatively, a non-metallized optical fiber is attached to the metal shim using a special ceramic adhesive coat whose metal constituents thermally match the thermal expansion co-efficient of the shim. After adhesive curing, a protective cover plate is attached. An embodiment for use with an extrinsic Fabry-Perot type sensor provides a metal plate with a fiber-sized groove that guides the target and the transmit/receive fiber optic elements together to form an air gap. Another embodiment metallizes the fiber optic elements with a mask ring having a depressed region into which a cover plate is attached. Each of the embodiments may be used with a white light interferometer to provide long term strain measurements at temperatures up to about 1,000° F., and may be used in radiation environments.

20 Claims, 7 Drawing Sheets

FIELD-MOUNTABLE FIBER OPTIC SENSORS FOR LONG TERM STRAIN MONITORING IN HOSTILE ENVIRONMENTS

FIELD OF THE INVENTION

The present invention relates generally to monitoring strain in hostile environments including elevated temperature and nuclear radiation environments. More specifically, the invention relates to methods and apparatuses providing field-mountable fiber optic sensors for long term strain monitoring in such environments.

BACKGROUND OF THE INVENTION

Fossil fuel powered steam generators, nuclear powered steam systems, and the like, employ many thousands of pipes through which water flows at high temperature and high pressure, e.g., boiler tube headers. The water within the pipe may flow at perhaps 1 m$^3$/second, at 600° F. or more, and at pressures of perhaps 1,100 psi. In a nuclear steam system, the outer surface of the pipe may be exposed to liquid at perhaps 2,500 psi.

Unfortunately, cracking and corrosion of the pipes, perhaps due to concentration of chemical impurities in the water at pipe crevices, can reduce the strength of the pipe walls. Unless detected sufficiently early, pipe failure and costly steam generator down-time can result. The failure mechanism appears to result from progressive intergranular attack and stress corrosion cracking, or "IGA/SCC". Unfortunately, it is difficult to reliably measure or successfully predict IGA/SCC failure on a long term basis within the hostile environment typified by the steam generators.

For example, it is known in the art to monitor strain at high temperatures using non-contact strain measuring techniques. But these devices are poorly suited for long-term measurements on power generation components, whose surfaces are often insulated and/or are subject to degradation. Further, the pipes to be monitored are frequently located in regions where visual interrogation is difficult or impossible. Also, non-contact strain measurement devices are affected by temperature, opacity, and the turbulence of any intervening atmosphere.

Contact strain gages such as electrical resistance gages are also known in the art and can sense strain at temperatures exceeding 700° F. on a long-term basis, and at even higher temperatures for short-term or dynamic measurements. For example, bonded resistance gages are commonly used continuously at temperatures up to 500° F. and have relatively high compliance, e.g., the ability to readily conform to the surface of the object under measurement.

So-called "Eaton" and "Kyowa" weldable resistance gages may be used at such temperatures, but have less compliance due to package stiffness. In the 600° F. to 650° F. range, such gages are made with a modified nickel-chrome alloy that has good drift characteristics, relative small apparent strain, and repeatable apparent strain characteristics. As used herein, "drift" refers to the stability of the strain gage output, while "apparent strain" refers to the change in output of the strain gage as a function of temperature in a regime in which hysteresis effects do not predominate. But it is difficult to adequately temperature compensate such devices using heat treatment techniques. Above 650° F., the sense material undergoes a metallurgical phase transition that can "reset" the temperature compensation, causing radical zero shifts.

In the 1000° F. to 1100° F. range, it is difficult to retain calibration, especially with resistance strain gages. Apparent strain, drift, and hysteresis due to temperature cycling present problems. At present, it is not known how to accomplish long-term static strain measurement at such elevated temperatures.

The drift problem has been somewhat addressed in the prior art using high-temperature capacitive strain gages. But such devices are not generally suitable for dynamic measurements above 100 Hz. Although low drift characteristics enable capacitive strain gages to measure creep strain change at steady-state, installation, calibration and other documentation can be costly. Nonetheless, capacitive type gages represent the only presently available contact devices useable for field measurement of creep strain at temperatures above 1000° F.

All of the above-described gages suffer the common problem of requiring electrical connections, which frequently are difficult to implement in a power plant generator environment. Further, electrical connections can act as antennae that render the gages susceptible to electromagnetic noise that can adversely affect the measurements. By contrast, fiber optic strain gages do not require such connections, and are useable at temperatures exceeding 700° F., and in fact can survive up to about 2,000° F.

A microbend fiber optic type strain gage is described in U.S. Pat. No. 5,020,379 to Berthold, in which a strain sensing optical fiber is sandwiched between a pair of tooth-edged end plates. Strain causes the end plates to move toward or away from each other. This causes the fiber to become deformed, which amplitude modulates a light signal transmitted through the fiber. This modulation is detected to provide strain information having excellent resolution. A second, equal length reference optical fiber may be sandwiched between a similar pair of tooth-edged end plates that are locked to each other but not attached to the structure. As such, the reference fiber compensates for source brightness variations and changes in fiber transmission over time, thus providing temperature compensation.

The Berthold device is similar to a conventional strain gage in that it modulates the "resistance" to light passing through the sensing fiber. The device is also similar to a conventional capacitance gage in that it relies upon relative movement of two plates for its measurement. However, unlike the capacitance gage, the microbend fiber stiffness makes the gage less compliant than capacitance gages, but still more compliant than weldable resistance gages. The microbend fiber optic strain gage can provide stable and extended life data at temperatures up to 1100° F.

One drawback with intensity-modulated sensors such as the Berthold device is that there is a light intensity loss due to couplers, fiber microbending, and other attenuation contributors along the length of the optical fiber. Because these losses degrade accuracy and reliability of the stress and temperature related signals to be measured, such devices are not well suited for long-term monitoring applications.

It is also known in the art to use phase-modulated optical fiber devices in an interferometric configuration. Intrinsic and extrinsic Fabry-Perot fiber optic interferometric sensors are useful for measuring localized strain (e.g., gage length of perhaps 1 mm to 10 mm) on a relative but not absolute basis. For example, a white light optical source is coupled into one of two branches of a 2:1 multimode fiber coupler/splitter. The main portion of the fiber is mounted with a tube and is spaced-apart by an air gap from a high resolution Fabry-Perot sensor.

Figure 1:
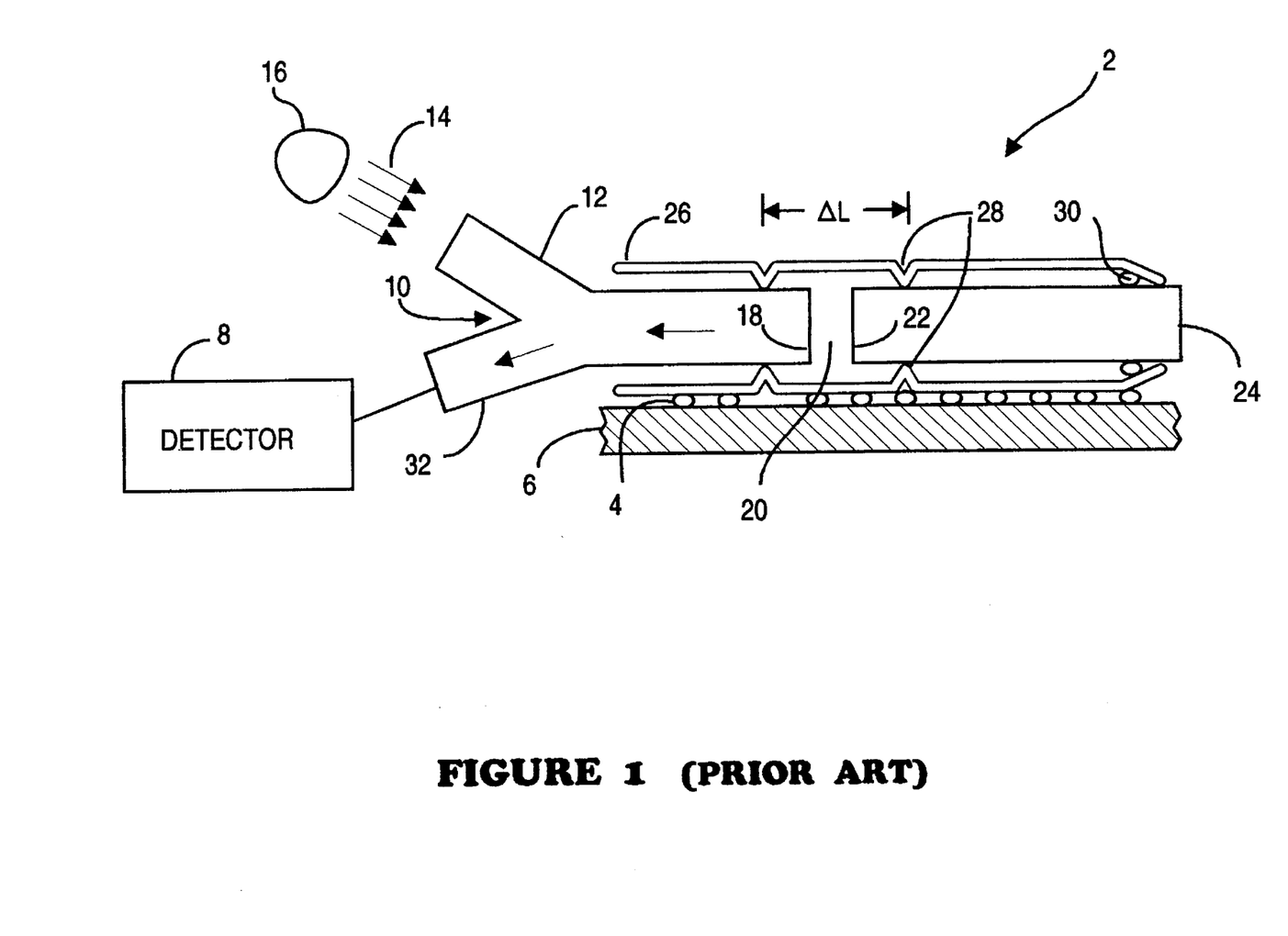
FIG. 1 is a simplified cross-sectional depiction of an extrinsic Fabry-Perot strain sensor mounted to a structure, according to the prior art.

FIG. 1 is a simplified cross-sectional depiction of such an extrinsic Fabry-Perot strain sensor 2 mounted with adhesive 4 to structure 6 for detection of strain within the structure by means of a detector 8. The sensor has a "Y"-shaped transmit/receive fiber optic structure 10 includes a first fiber optic branch 12 that receives light 14 from a preferably white source 16. (For ease of illustration, FIG. 1 does not depict a protective buffer coating over branches 12 and 32 of structure 10.) The light travels to surface 18 of the fiber optic, traverses an air gap 20 and reflects, at least partially, from surface 22 of a target fiber 24. The sensor structure typically includes a quartz outer tube 26 that is fused at joints 28 to the underlying transmit/receive and target fiber optic members. (Epoxy 30 or the like joins tube 26 to reflector fiber 24.) The lateral distance between these fused joints 28 defines a dimension AL that will decrease slightly as the strain sensor is subjected to tension, and that will increase slightly as sensor 2 is subjected to compression.

Depending upon the lateral separation of the air gap 20, some light frequencies within light energy 14 will reflect more strongly than others from target fiber surface 22. These wavelengths traverse branch 32 of "Y"-shaped structure 10 and are presented to detector 8. Stated differently, if strain causes changes to the air gap dimension, the strain may be characterized by a difference in the frequency or frequencies that are most strongly reflected. These frequency differences may be detected with a spectrum analyzer detector 8, to provide a measure of the changing value of ΔL, and thus to measure the strain to which sensor 2 was subjected.

One difficulty with such devices is that constructing the sensor requires modifying the optical fibers. Further, attaching, in the field or otherwise, the glass fiber optical sensor to the typically metallic structure that is to be temperature monitored is not trivial, especially at higher temperatures. Adhesives, e.g., adhesive 4 in FIG. 1, available for attaching the strain sensor to such structures cannot survive temperatures exceeding about 600° F.

One prior art technique for attaching a fiber optic strain sensor to a metal structure is to plasma spray molten metal to encapsulate the strain sensor and thus to attach it to the surface of the metal structure to be monitored. Unfortunately, the force exerted by the plasma spray upon the fiber-optic is severe, and can damage the sensor even before the plasma attachment process has ended. Further, plasma spraying does not lend itself to field-installation of the fiber optic sensors.

Another prior art technique for attaching fiber optic strain sensors to a metal structure uses high temperature ceramic adhesive. However, the thermal expansion coefficient for such adhesive is so dissimilar from the coefficient for the metal structure, that failed attachment joints can result.

Further, whether plasma spraying or ceramic adhesives are used, it is simply not convenient to attach a fiber optic strain sensor to a structure in the field.

In short, while phase-modulated fiber optic strain sensors can provide long term measurements at elevated temperatures, there is a need for a method and mechanism for producing such sensors such that they can be field-mounted to a metal structure to be monitored.

The present invention provides a method and mechanism for providing such predictions.

SUMMARY OF THE INVENTION

In a first embodiment, a metallized glass fiber optic sensor is bonded to a metal shim to form a sensor unit that may be field-welded to the structure of interest for monitoring structural strain. Preferably the metal shim os selected to be the same material as the structure of interest. Bonding is accomplished by first metallizing the fiber optic sensor, after which it is brazed or soldered to the shim, or is electroplated. In a second embodiment, a non-metallized optical fiber is attached to a metal shim using a special ceramic adhesive coat whose metal constituents thermally match the expansion of the shim.

Other embodiments directed for use with an extrinsic Fabry-Perot sensor provide a metal plate having a longitudinal groove sized to accommodate the diameter of the fiber optic elements. The target fiber optic element and the transmit/receive fiber optic element are placed in the groove and thus guided toward one another. When the two fiber optic elements are spaced-apart the requisite distance, a second metal plate, which may also be grooved, is attached, and the two metal plates are spot welded together. A ceramic adhesive coat having thermal properties similar to the first metal plate preferably also is used to secure the fiber optic elements. Alternatively, the fiber optic elements may be metallized, with a mask ring formed about a segment of the elements. A cover plate is fitted into the depressed segment and is spot welded to a the first metal plate to secure the fiber optic elements. In these extrinsic Fabry-Perot sensor embodiments, the resultant sensor may be welded to the structure under test, in the field.

Any of the embodiments may be used with a white light interferometer. The resultant strain sensor can provide long term measurements even at elevated temperatures of about 1,000° F., and even in nuclear radiation hazardous environments.

Other features and advantages of the invention will appear from the following description in which the preferred embodiments have been set forth in detail, in conjunction with the accompanying drawings.

DETAILED DESCRIPTION OF THE PREFERRED EMBODIMENT

In a first embodiment, a fiber optic sensor is metallized, and is then brazed or soldered to a metal shim that may then be spot welded in the field to the structure to be monitored for stress. The fiber optic sensor may include, without limitation, extrinsic Fabry-Perot optical fiber strain sensors such as was shown in FIG. 1.

Figure 2A:
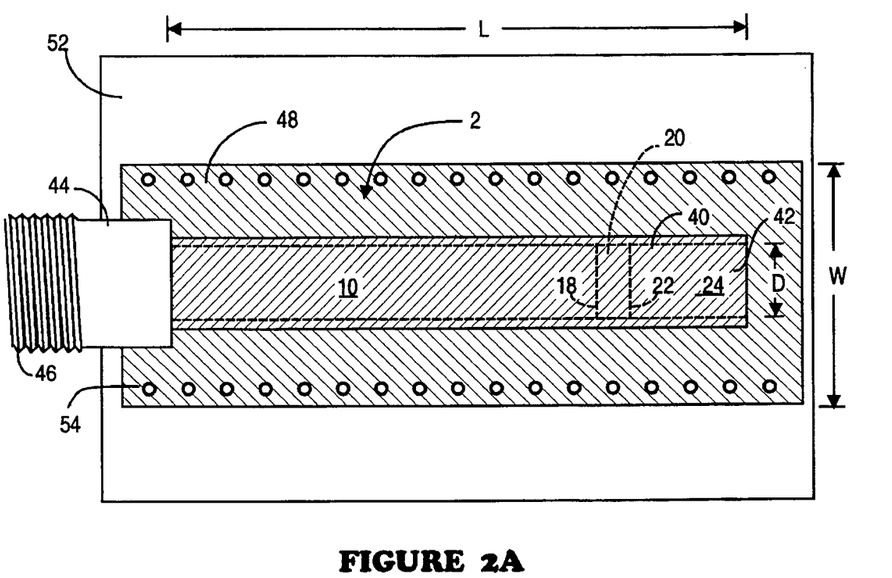
FIG. 2A is a view of a metallized sensor, affixed to a metal shim for spot welding in the field to a structure, according to a first embodiment of the present invention.

Referring now to FIG. 2A, a fiber optic sensor, depicted generally as 2, includes a fiber optic portion 40 whose exterior is covered with a metallization layer 42. To improve ruggedness of the sensor, a portion of the fiber optic may include a metal sheath or tube 44, as well as an overlayer of protective armored cable 46, or the like. Sensor 2 may be an external Fabry Perot sensor (e.g., as was shown in FIG. 1), or may be any other fiber optic sensor that preferably relies upon phase modulation.

The portion of the sensor shown in FIG. 2A includes the spaced-apart air gap 20 (shown in phantom), as well as the target or reflector fiber 24, its reflective end 22, and the common branch of the transmit-receive optical fiber 10 and its end 18. It is understood that the "Y"-shaped branch in the transmit-receive optical fiber 10 is to the left of what is shown in FIG. 2A, as is the optical source and a detector. One source of suitable fiber optic material is G2 Systems Fiber Optic, located in Los Angeles, Calif.

Generally, the outer diameter (D) of the fiber optic portion of sensor 2 will be about 125 μm, the extended fiber optic length (L) will be about 5 mm to 20 mm, and the shim 48 may have a typical width (w) of about 10 mm, and a shim thickness (T) of about 500 μm. Other dimensions may of course be used.

In a first embodiment, the exterior surface of the fiber optic sensor 2 is first metallized with layer 42, preferably by plating with gold or nickel, although other plating metals may be used instead. The thus metallized sensor may then be attached to a metal shim 48, preferably by brazing or soldering 50. Generally, metal shim 48 will be selected to be the same material as the structure of interest 52, to which shim 48 (and thus sensor 2) may be attached in the field, preferably by spot welding 54.

As an alternative to soldering or brazing, the metallized fiber optic sensor 2 may be placed atop shim 48, whereupon the sensor and shim are electro-plated together, bonding sensor to shim. In this embodiment, the interface 50 between the metallized layer 42 and the shim 48 will be an electro-plated bond rather than a solder or brazed bond.

Figure 2B:
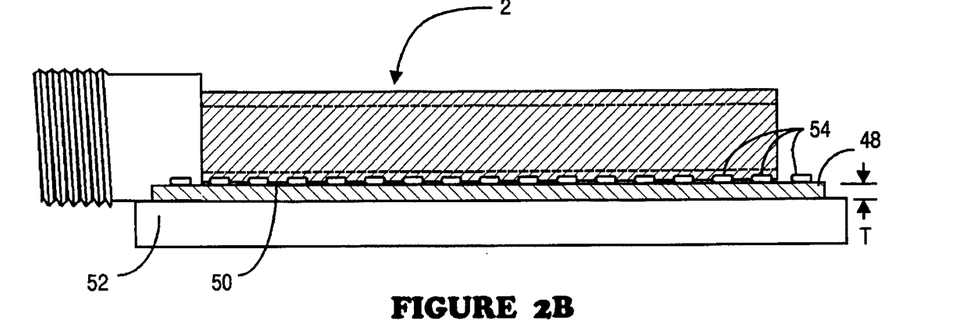
FIG. 2B is a side view of the metallized sensor of FIG. 2A.

Whether soldering, brazing, or electro-plating is used to secure the metallized sensor to the shim, the resultant sensor is relatively rugged and may be safely carried to the field for installation. As noted, in many power generator applications, the sensor will be spot-welded to a pressurized pipe and thus structure 52 in FIGS. 2A and 2B may represent a portion of the pipe wall of such structure.

Figure 2C:
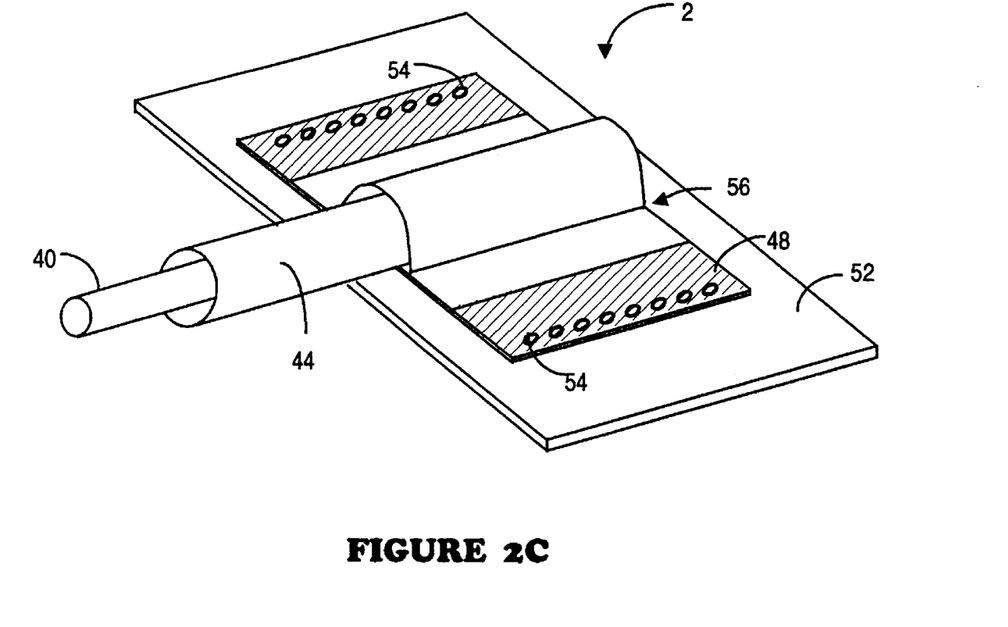
FIG. 2C is a perspective view of the metallized sensor of FIG. 2A, including a protective cover plate.

As shown by FIG. 2C, a cover plate 56 may also be added to structure 52 for further protection after field-installation of sensor 2. Spot welding 54 or the like may be used to secure the protective cover plate 52 to the metal shim 48. Preferably the spot welding is relatively close to the body of the fiber optic elements to minimize fiber slipping as a result of thermal expansion.

Figures 3A, 3B, 3C, 3D:
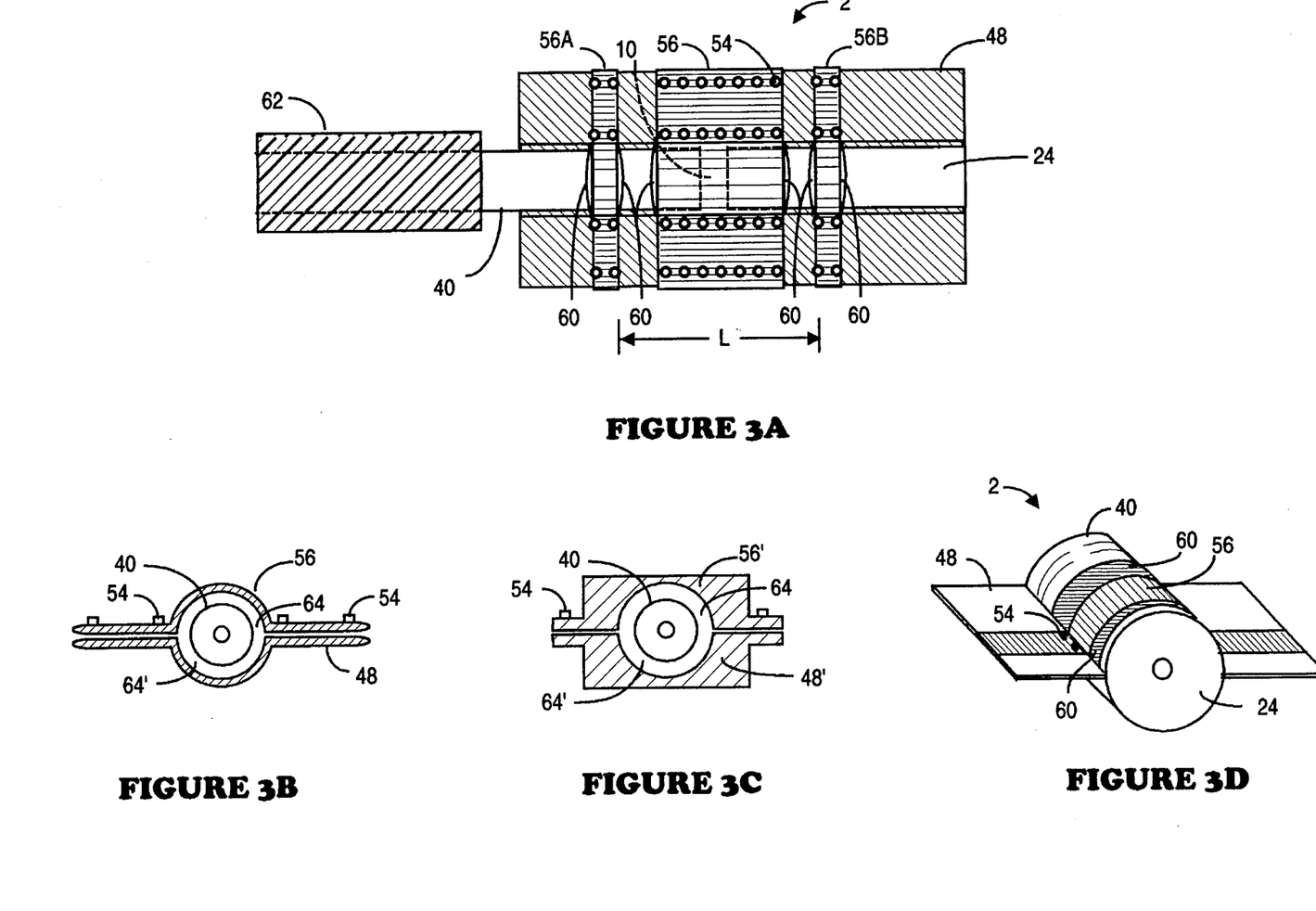
FIG. 3A is a plan view of an alternative embodiment of an internal Fabry-Perot sensor, depicting use of a concave-shaped cover plate and metal shim attachment using a specialized ceramic adhesive coat.
FIG. 3B is a end view of the embodiment of FIG. 3A.
FIG. 3C is an end view of an alternative embodiment of a sensor, depicting use of a concave-milled cover plate.
FIG. 3D is a perspective view of an alternative embodiment of a sensor, according to the present invention.

As shown in the alternative embodiment of FIGS. 3A and 3B, sensor 2 may be attached to metal shim 48 using a specialized ceramic adhesive coat 60, rather than by metallizing the outer surface of the fiber optic. The ceramic adhesive coat 60 preferably includes metal constituents whose thermal expansion properties match those of the metal shim 48. Coat 60 is applied around the fiber optic elements 40, 24 on either side of cover plate 56, and cured, to help mechanically lock the fiber optic elements in place. The distance L between the points of attachment of the fiber optic elements defines the effective sensor length. A suitable source for coat 60 is SermeTel 588, commercially available from Sermatech International, Inc., located in Limerick, Pa. SermeTel 588 is commonly used as an insulation coating for copper wires that are exposed to very high temperatures, e.g., perhaps 1,800° F.

After adhesive curing, a cover plate 56 is fitted, slightly loosely, over the fiber optic elements to keep the interference cavity gap clean, and to prevent vibration of the fibers. Understandably, it is critical that transmit/receive fiber optic 40 and target fiber optic 24 almost meet such that their respective faces are spaced-apart to form gap 10. Accordingly, cover plates 56, and (if used) 56A, 56B are concave in cross-section, defining groove-like regions 64, 64' that guide fiber optic elements 40 and 24. The groove region concave dimension is at least the dimension of the diameter of the fiber optic elements, and is typically perhaps 0.005" (0.13 mm).

In the embodiment of FIG. 3B, cover plates 56, 56A, 56B have been formed by bending metal over a rod-like member having a desired curved profile to create the groove-like regions 64, 64' are present. As noted, these regions help guide and support the fiber optic elements, and for an internal Fabry-Perot sensor, assure that the spaced-apart end faces can indeed "find" each other. Spot welding 54 secures the upper plates 56, 56A, 56B to the lower base plate 48. To minimize shifting of the fiber optic elements 40 and 24, e.g., from thermal changes, it is preferred that the spot welds be close to (as opposed to distant from) the fiber optic elements.

In the embodiment of FIG. 3C, the upper and lower plates (here 56', 48') have been formed by milling a concave groove 64, 64' sized to accommodate the diameter of the fiber optic elements 40, 24. So formed, these plates guide and retain the fiber optic elements, and ensure that the spaced-apart region 10 is created to form an internal Fabry-Perot sensor. Spot welding 54 preferably retains the upper cover plate 56' to the lower plate 48'. FIG. 3D is a perspective view of a sensor similar to what is shown in FIG. 3A, except that the additional cover plates 56A, 56B are omitted.

Figure 4:
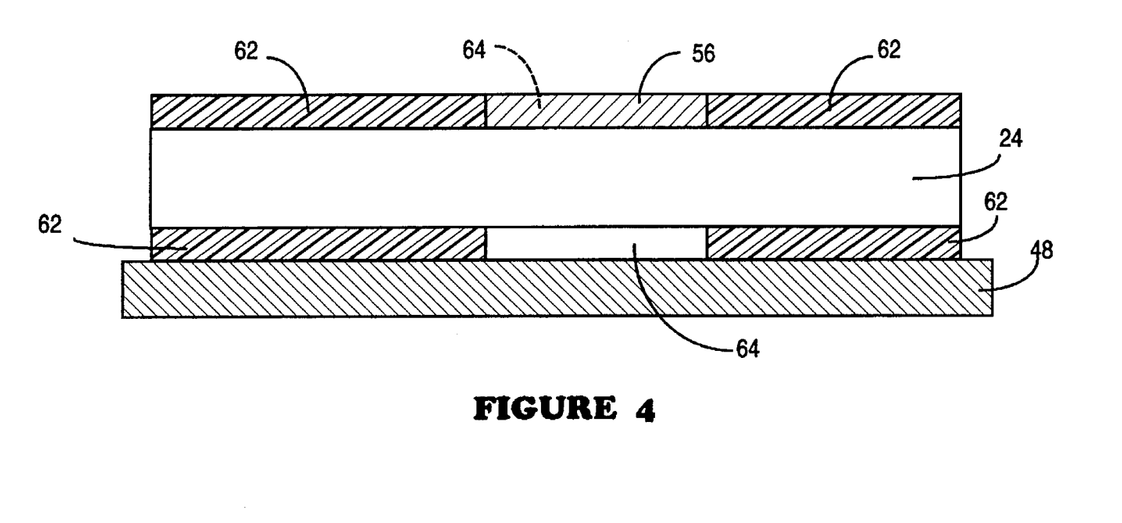
FIG. 4 is a cross-sectional view of an alternative embodiment, according to the present invention.

FIG. 4 depicts an alternative embodiment in which the optical fibers, e.g., 24, 40, are metallized with an overlayer 62 that defines a non-metallized masked ringed region 64. The left-to-right width of the upper depressed portion of region 64 is sized to accept a cover plate 56 that is spot welded to a base plate 48, as has been described. The lower portion of region 64 is void. Formation of a masked band region 64 may be accomplished using etching or other techniques well known in the relevant art.

Each embodiment of FIG. 3A–3D and FIG. 4 permits fabrication of a field-mountable extrinsic Fabry-Perot sensor that can operate above 600° F. Each such sensor is more robust than prior art extrinsic Fabry-Perot sensors, whose deficiencies were described with respect to FIG. 1.

Figure 5:
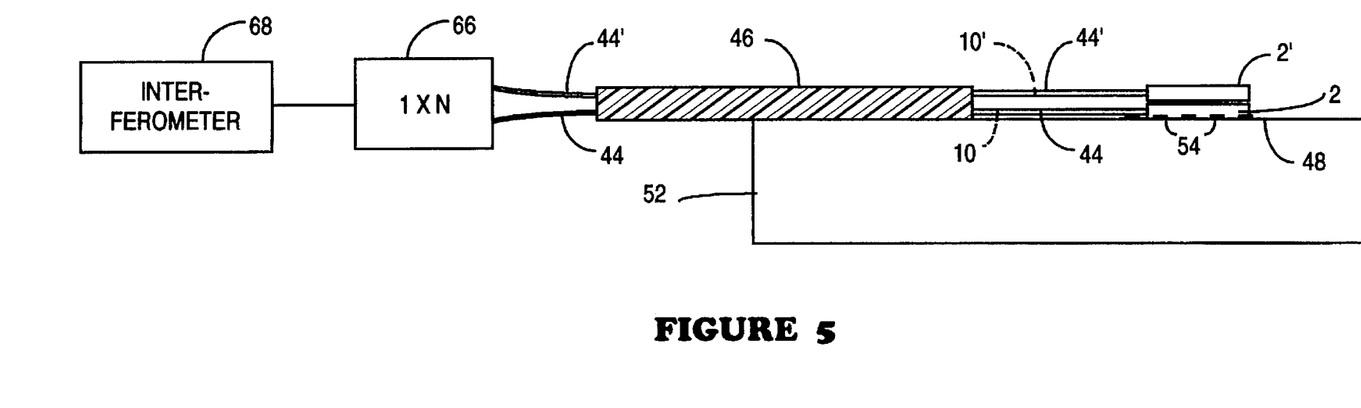
FIG. 5 depicts a configuration for discerning mechanical strain from thermal strain, and for using multiple sensors, according to the present invention.

In practice, strain sensors constructed according to the present invention will be sensitive both to temperature and to strain. However, as depicted in FIG. 5, the mechanical strain and thermal strain components can be distinguished by using two identical sensors 2 and 2', preferably fabricated as an embodiment described earlier herein. In FIG. 5, a single armored cable 66 encompasses at least two optical fibers 10 and 10' that are preferably protected by metal tubes 44 and 44', respectively.

Sensor 2 preferably includes a metal shim 48 that is of the same material as the structure of interest 62. Sensor 2, but not sensor 2', is fixedly attached to structure 62, e.g., by spot welds 54. By contrast, sensor 2' is in the same environment but is not attached to structure 62. Thus, while both sensors 2 and 2' will experience the same thermal, pressure, and other ambient environmental changes, only sensor 2 will be subject to mechanical strain from structure 62.

As shown in FIG. 5, the N distal ends of the fiber optic elements may be terminated at a 1×N optical switch or coupler 66, that outputs a switchable signal to instrumentation 66, preferably a white light interferometer and associated electronics. Instrumentation 66 can subtract the signal from gage 2' from the signal from gage 2 to provide a true measure of the mechanical stress components experienced by gage 2.

It may also be desirable to measure strain at various locations on a structure 52. If desired, the lengths of fiber optic materials 10 and 10' (as well as associated protective tubes 44, 44') may differ from each other. Thus, sensor 2 might be fixedly attached to structure 52 at one location, and sensor 2' may be fixedly attached at another location. Of course, more than two fiber optic cables and sensors may be used. Optionally pairs of such cables and sensors may be used to discern mechanical from thermal stress by fixedly securing but one sensor to structure 52, leaving the environmentally adjacent sensor unattached (as shown in FIG. 5).

To promote reliability, at least some such multiplexed multiple sensors may be parallel-coupled (rather than series-coupled). Such redundancy would permit other sensors to continue to output useful information to instrumentation 68, despite the failure of one (or more than one) sensor.

Figure 6:
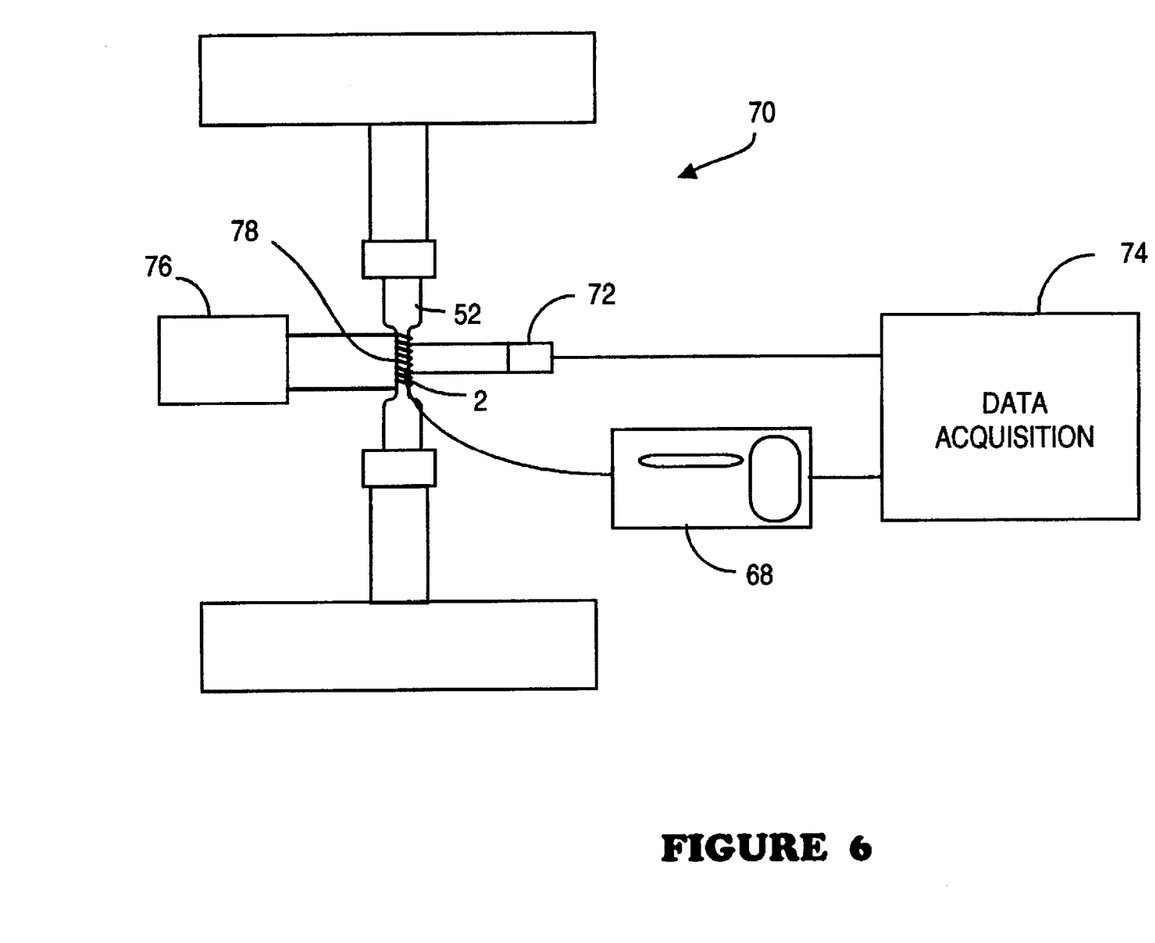
FIG. 6 depicts a test setup for comparing high and lower temperature measurements of a conventional strain sensor with measurements from a sensor according to the present invention.

FIG. 6 depicts a test setup used by applicants to test a sensor modelled after the ceramic adhesive embodiment shown in FIGS. 3A and 3B. A 25 μm thick metal plate structure 52 was subjected to strain using conventional strain inducing apparatus 70, and a strain sensor 2 was spot welded to structure 52. The target fiber in sensor 2 was a 125 μm diameter stainless steel rod with a polished end face to reflect light. An interferometer 68 was coupled to the transmit/receiver optic fiber associated with sensor 2. The optical light source (not shown) was a laser, and thus strain in the test specimen detected by sensor 2 could be recognized by the interferometer as optical fringes. If desired, the same instrumentation could be used with white-light interferometers.

A reference extensometer 72 was also affixed to the test structure 52, and data acquisition instrumentation 74. A power source 76 coupled to a heating element 78 produced controlled thermal strain in the test structure 52.

Figure 7A:
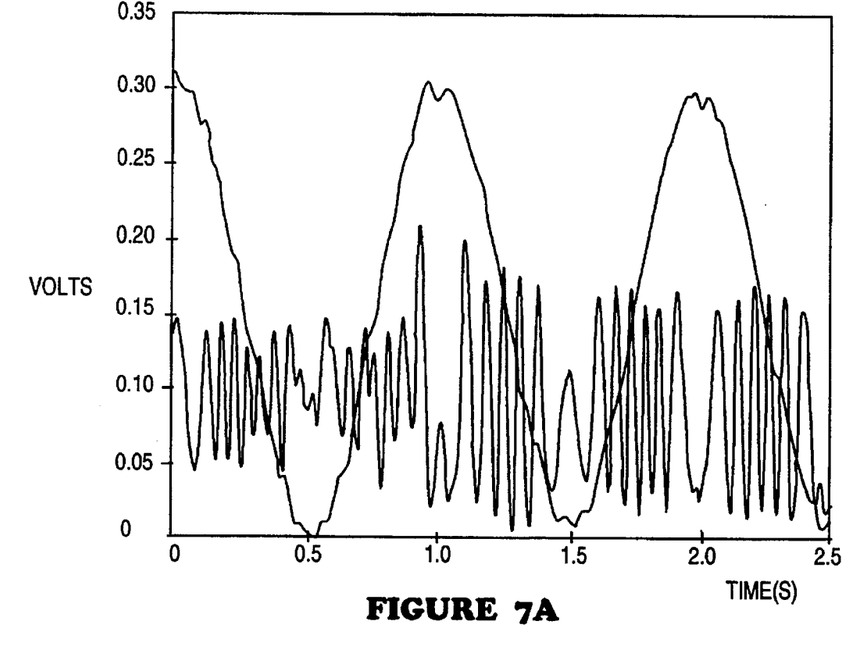
FIG. 7A depicts test data for 1000° F. ambient obtained from the test setup of FIG. 6.
Figure 7B:
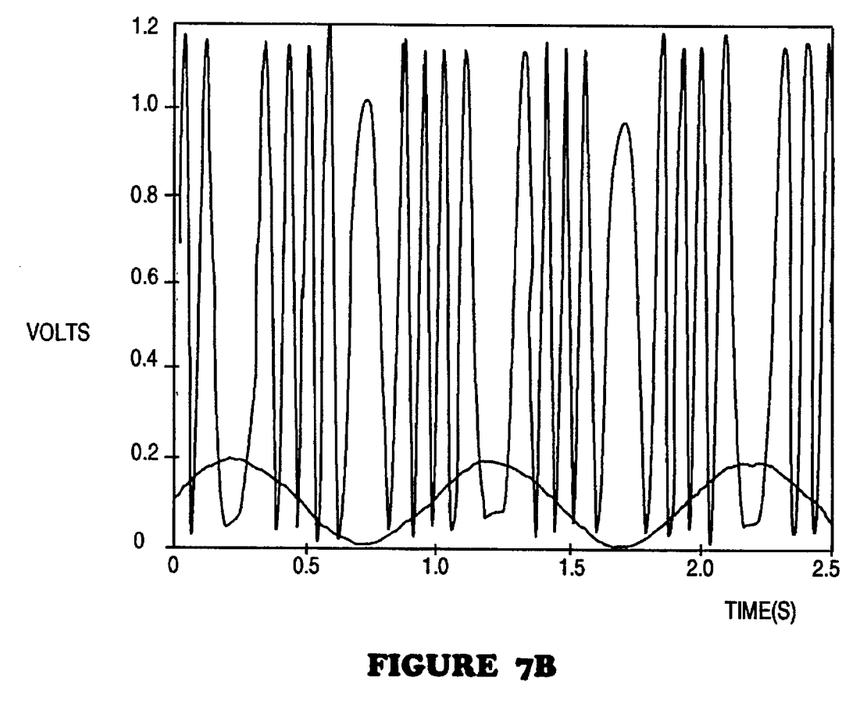
FIG. 7B depicts test data for 75° F. ambient obtained from the test setup of FIG. 7.

The specimen structure 52 was strained in a cyclic fashion over one minute intervals, and corresponding data from the fiber-optic strain sensor 2, and from the extensometer 72 were obtained. FIGS. 7A and 7B depict, respectively, data obtained from the fiber optic sensor 2 and from the extensometer 72 at ambient-induced temperatures of 1000° F. and 75° F., respectively. In each instance, the lower frequency waveform is data obtained from the extensometer strain sensor 72, while the higher frequency waveform represents optical fringes detected by the interferometer from strain sensor 2.

As shown in FIGS. 7A and 7B, strain 2 sensor-produced optical fringes correlated directed to the strain sensed by the conventional extensometer. Essentially, the number of high frequency sensor 2-produced fringes correlates to the amplitude of the lower frequency extensometer 72 data. Those skilled in the art will appreciate that the same gage construction may be used with a white light interferometer to provide absolute data. Following the tests, applicants' sensor 2 was examined microscopically and found to have survived the 1000° F. ambient temperature without evidence of failure.

Although the preferred embodiments have generally be described with respect to use in high temperature environments, it is understood that sensors according to the present invention may be used at low temperatures. Further, the present invention may be used to measure strain in hazardous environments, such as nuclear reactor sites. In such applications, radiation-hardened fiber optic elements are preferred, to minimize radiation-induced browning that could affect measurements.

Modifications and variations may be made to the disclosed embodiments without departing from the subject and spirit of the invention as defined by the following claims.

What is claimed is:

1. A method for providing a field-mountable fiber optic sensor for sensing strain in a structure, the method comprising the following step:

(a) bonding a fiber optic element of said fiber optic strain sensor to a metal shim that is of like material as said structure;

wherein said metal shim is spot weldable to said structure.

2. The method of claim 1, wherein step (a) is carried out by first metallizing said fiber optic element, and then bonding using a technique selected from the group consisting of (i) brazing, (ii) soldering, and (iii) electro-plating.

3. The method of claim 2, wherein metallizing said fiber optic element is carried out using a metal selected from the group consisting of (i) gold, and (ii) nickel.

4. The method of claim 1, further including, after the step of bonding, attaching a protective cover plate, over said fiber optic element, to said metal shim.

5. The method of claim 1, wherein step (a) is carried out by bonding with a ceramic adhesive coat having at least one metal constituent that matches a thermal expansion characteristic of said structure.

6. The method of claim 1, wherein said fiber optic element is a component in an extrinsic Fabry-Perot strain sensor.

7. The method of claim 1, wherein step (a) further includes:

(a-1) metallizing said fiber optic element and then removing a mask ring portion of metallization surrounding a banded region of the metallized fiber optic element;

(a-2) providing a curved cover plate having a width sized to fit a width of said mask ring portion of metallization; and (a-3) providing a second plate to which said curved cover plate is spot welded, said fiber optic element being sandwiched therebetween.

8. A method for providing a field-mountable extrinsic Fabry-Perot fiber optic sensor that includes spaced-apart first and second fiber optic elements having a common outer diameter, said sensor sensing strain in a structure, the method comprising the following steps:

(a) providing a first metal plate defining a longitudinally-extending groove having a groove diameter at least equal to said common outer diameter;

(b) using said groove as a guide, extending said first and second fiber optic elements into said first metal plate until opposing end faces of said first and second fiber optic elements are spaced apart a chosen gap distance;

(c) sandwiching said first metal plate and said first and second fiber optic elements against a second metal plate;

(d) spot welding together said first metal plate and said second metal plate, said first and second fiber optic elements being retained therebetween;

wherein said second metal plate is spot weldable to said structure.

9. The method of claim 8, wherein step (c) includes providing said second metal plate with a longitudinally-extending groove having a groove diameter at least equal to said common outer diameter.

10. The method of claim 8, wherein step (a) is carried out by milling said groove in said first metal plate.

11. The method of claim 8, wherein step (a) is carried out by partially curving said metal plate around a cylinder whose diameter matches said outer diameter.

12. The method of claim 8, wherein at step (d), said spot welding occurs at portions of said first metal plate adjacent the sandwiched first and second fiber optic elements.

13. The method of claim 8, including an additional step of adhesively securing portions of said first and second fiber optic elements to at least said first metal plate.

14. The method of claim 13, wherein said additional step is carried out with ceramic adhesive coat having metal constituents substantially matching thermal characteristics of said first metal plate.

15. A system for monitoring strain in a structure using a fiber optic sensor, the system comprising:

a metal shim having thermal properties substantially similar to thermal properties of said structure;

a fiber optic sensor having an exterior surface, a portion of said exterior surface being metallized;

said fiber optic sensor being attached to said metal shim using a technique selected from a group consisting of (i) brazing, (ii) soldering, and (iii) electro-plating;

said shim being affixed to said structure after attachment of said fiber optic sensor to said shim; and means, coupled to said fiber optic sensor, for monitoring strain in said structure sensed by said fiber optic sensor.

16. A system for monitoring strain in a structure using a fiber optic sensor that includes first and second fiber optic elements, the system comprising:

a first metal plate, having thermal properties substantially similar to thermal properties of said structure, defining a longitudinal groove having a diameter at least equal to a diameter of said first and second fiber optic elements;

said first and second fiber optic elements being mounted in said longitudinal groove such that end faces of said first and second fiber optic elements are spaced apart a chosen distance to define a Fabry-Perot interference gap; and a second metal plate, spot welded to said first metal plate with said first and second fiber optic elements being sandwiched and retained between said first and said second metal plate;

said second metal plate being weldable to said structure to allow said fiber optic sensor to sense stress in said structure; and means, coupled to said fiber optic sensor, for monitoring strain in said structure detected by said fiber optic sensor.

17. The system of claim 16, wherein said longitudinal groove in said first metal plate is formed using a technique selected from the group consisting of (i) milling said longitudinal groove, and (ii) bending said first metal plate about cylinder having a diameter approximating a diameter of said groove to form said longitudinal groove.

18. The system of claim 16, wherein said second metal plate defines a longitudinal groove having a diameter approximating at least equal to a diameter of said first and second fiber optic elements.

19. The system of claim 16, wherein said means for monitoring strain includes a white light interferometer.

20. A system for monitoring strain in a structure using a fiber optic sensor, the system comprising:

said fiber optic sensor including first and second fiber optic elements having a metallized exterior surface that defines a depressed mask ring section;

a curved metal plate, having a width less than a width of said mask ring section, and having a diameter at least equal to a diameter of said first and second fiber optic elements;

a second metal plate having thermal properties substantially similar to thermal properties of said structure, welded to said curved metal plate such that said first and second fiber optic elements are sandwiched therebetween;

said second metal plate being weldable to said structure to allow said fiber optic sensor to sense stress in said structure; and means, coupled to said fiber optic sensor, for monitoring strain in said structure detected by said fiber optic sensor.

* * * * *